(12) United States Patent
Krebs et al.

(10) Patent No.: US 6,595,571 B1
(45) Date of Patent: Jul. 22, 2003

(54) SELF RETAINING MOUNTING ASSEMBLY

(75) Inventors: Scott E. Krebs, Marshall, MI (US); Derik Reichhart, Coldwater, MI (US)

(73) Assignee: Crotty Corporation, Quincy, MI (US)

( * ) Notice: Subject to any disclaimer, the term of this patent is extended or adjusted under 35 U.S.C. 154(b) by 0 days.

(21) Appl. No.: 10/060,733

(22) Filed: Jan. 30, 2002

(51) Int. Cl.⁷ .................................................. B60J 3/00
(52) U.S. Cl. ................ 296/97.9; 296/97.13; 248/289.11
(58) Field of Search ............................ 296/97.9, 97.13; 248/289.11

(56) References Cited

U.S. PATENT DOCUMENTS

| | | | | |
|---|---|---|---|---|
| 4,989,911 A | * | 2/1991 | Van Order | 296/97.9 |
| 5,056,853 A | * | 10/1991 | Van Order | 296/97.9 |
| 5,201,564 A | * | 4/1993 | Price | 296/97.9 |
| 5,499,854 A | | 3/1996 | Crotty, III et al. | 296/97.13 |
| 5,857,728 A | | 1/1999 | Crotty, III | 296/97.9 |
| 6,003,928 A | | 12/1999 | Curtindale | 296/97.9 |
| 6,015,126 A | | 1/2000 | Murdock | 248/289.11 |
| 6,021,986 A | | 2/2000 | Murdock | 248/289.11 |
| 6,179,366 B1 | | 1/2001 | Hansz | 296/97.9 |

* cited by examiner

Primary Examiner—D. Glenn Dayoan
Assistant Examiner—Lori L Coletta
(74) Attorney, Agent, or Firm—Rader, Fishman & Grauer, PLLC

(57) ABSTRACT

A sun visor mounting assembly for mounting a sun visor to a vehicle panel is provided that includes a mounting component, a bezel component and an elbow connectable with the sun visor. The mounting component is mountable to the panel and includes a plurality of spaced apart towers separated by sidewalls. Each tower includes an end surface that engages a face of the panel and each sidewall includes a resilient retaining member extending therefrom. Each retaining member includes a catch, wherein the opposing faces of the panel are gripped between the catch and the towers to retain the mounting component against the panel. The bezel component is connected to the mounting component and defines an opening within which the elbow is rotatably received. The preferred methods of securing the mounting assembly to a vehicle are also disclosed.

22 Claims, 8 Drawing Sheets

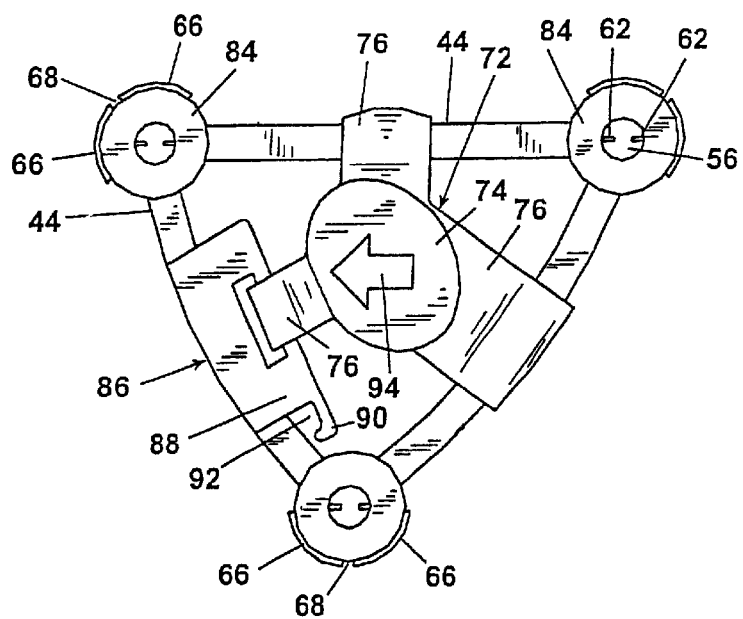
Fig. 4
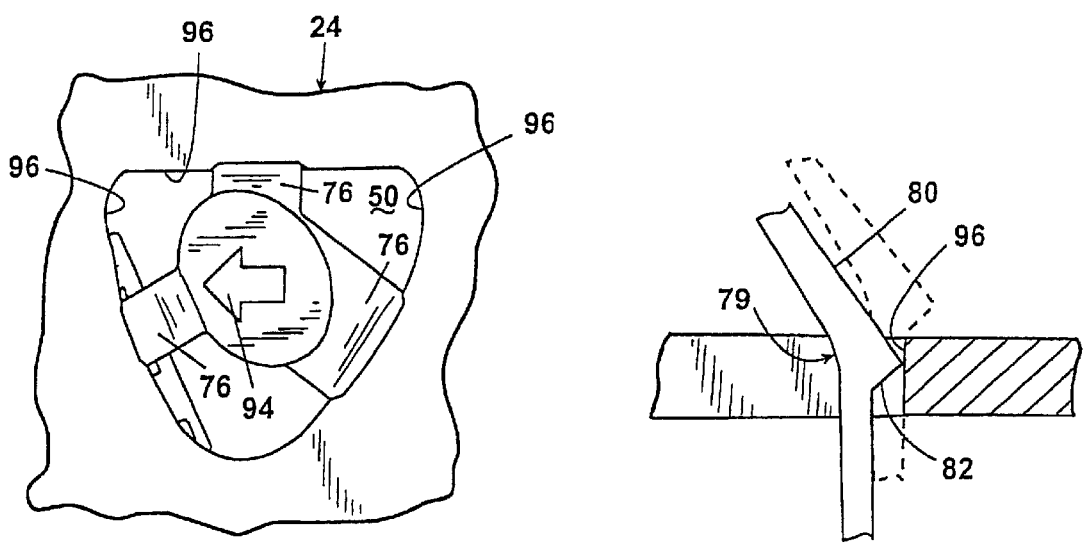
Fig. 5  Fig. 6

US 6,595,571 B1

SELF RETAINING MOUNTING ASSEMBLY

BACKGROUND OF THE INVENTION

1. Field of the Invention

The present invention relates generally to sun visors for vehicles and, more particularly, to a sun visor mounting assembly for a vehicle.

2. Description of the Related Art

Vehicle sun visors are typically mounted in a vehicle using a mounting bracket assembly that allows a visor blade to pivot between a "stored" position adjacent an interior headliner and a "use" position adjacent the vehicle windshield. Since the sun may enter the side window, conventional mounting bracket assemblies typically allow the visor blade to be pivoted between the windshield and the side window in the "use" position.

A number of methods have been proposed for mounting the sun visor to the vehicle roof and/or headliner. One known method is a snap-in type mount. This type of mount is generally the easiest and most cost effective to install, since a mounting member simply snaps into a hole in the roof panel of a vehicle. A bezel, having a pivot rod and visor blade secured thereto, is then attached to the mounting member to complete the installation of the sun visor.

It has become increasingly more popular for vehicle manufacturers to insert an energy-absorbing material, such as foam, between the headliner and the vehicle roof, to substantially reduce injuries related to a vehicle occupant striking the vehicle roof during an accident. The addition of an energy-absorbing material between the headliner and vehicle roof significantly increases the distance between the bezel and vehicle roof requiring the use of a relatively long mounting member. Moreover, the mounting configuration can be complex requiring precise alignment of the mounting member to the vehicle roof. Therefore, it is desirable to have a snap-in mounting member that facilitates proper alignment and exhibits a length sufficient for use with a vehicle employing an energy-absorbing material under the headliner.

SUMMARY OF THE INVENTION

A mounting assembly for moveably securing a sun visor to a vehicle panel is provided that can be readily installed in a vehicle having an energy-absorbing material under the headliner. In a preferred embodiment of the present invention, the mounting assembly includes a mounting component, a bezel component and an elbow connectable with the sun visor. The mounting component is mountable to the vehicle panel and includes a plurality of spaced apart towers separated by sidewalls. Each tower includes an end surface that engages a face of the panel and each sidewall includes a resilient retaining member extending therefrom. Each retaining member includes a catch, wherein opposing faces of the panel are gripped between the catch and the towers to retain the mounting component against the panel. The bezel component is connected to the mounting component and defines an opening within which the elbow is rotatably received. The preferred methods of securing the mounting assembly to a vehicle are also disclosed.

Among other advantages, the mounting assembly provides an easily installed, snap-in type, mounting component having features that facilitate a blind installation and prevent improper assembly of the mounting assembly into a vehicle. Another advantage is that the mounting component permits the mounting assembly to be installed in a vehicle employing an energy-absorbing material under the headliner.

Various additional aspects and advantages of this invention will become apparent to those skilled in the art from the following detailed description of the preferred embodiment, when read in light of the accompanying drawings.

BRIEF DESCRIPTION OF THE DRAWINGS

The features and inventive aspects of the present invention will become more apparent upon reading the following detailed description, claims, and drawings, of which the following is a brief description:

FIG. 4 is a top view of the mounting component of FIG. 3.

FIG. 5 is a top view of the mounting component of FIG. 3 installed in a vehicle roof panel.

FIG. 6 is a partial cross sectional view of a retaining member during and after insertion into the vehicle roof panel.

DESCRIPTION OF THE PREFERRED EMBODIMENTS

Figure 1:
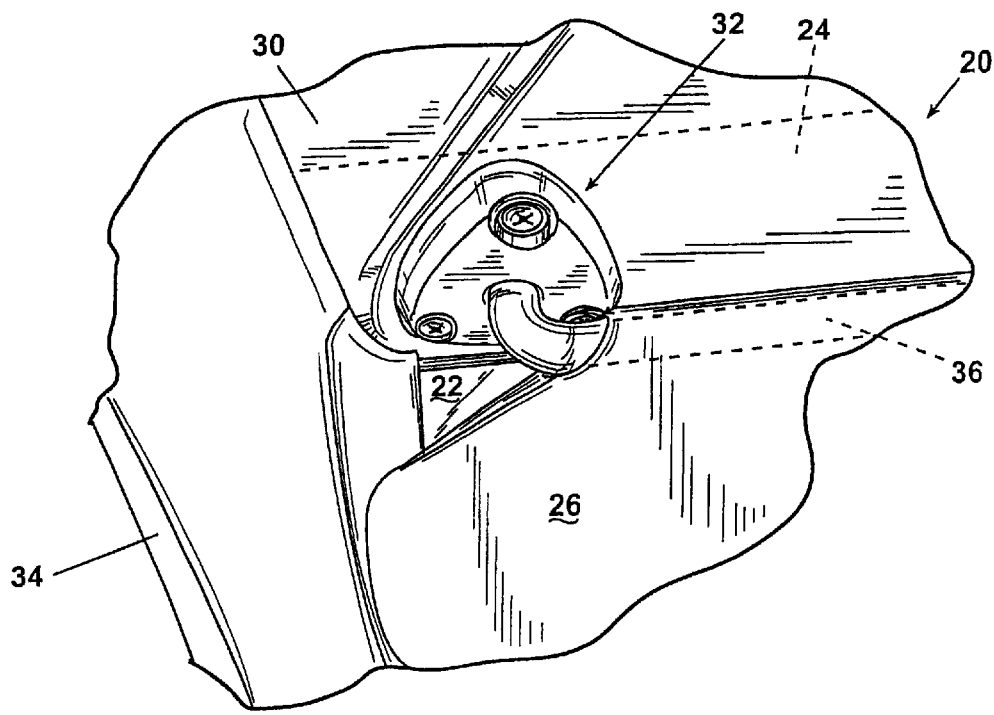
FIG. 1 is a fragmentary perspective view of a sun visor assembly installed in a vehicle.
Figure 2:
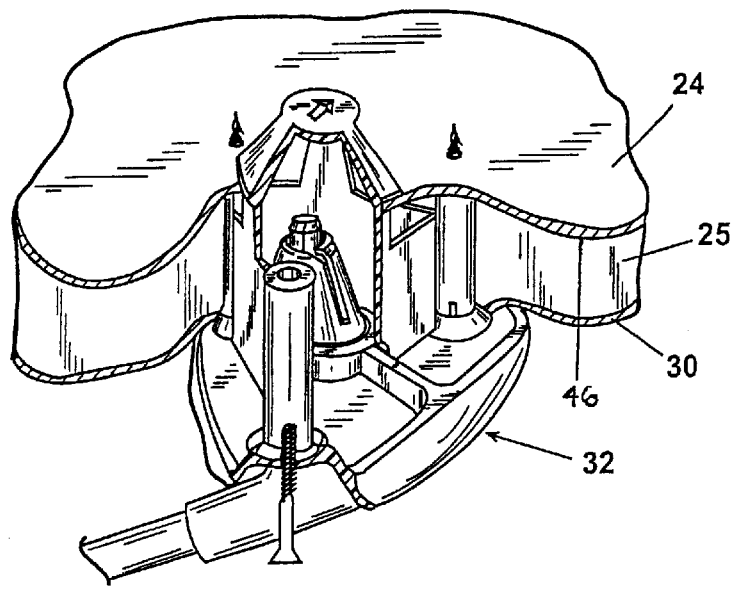
FIG. 2 is a fragmentary perspective view of the interior of a mounting assembly according to a preferred embodiment of the present invention.

Referring now to the drawings, the preferred embodiments of the present invention are described in detail. Referring to FIGS. 1 and 2, a vehicle 20 is shown that includes a windshield 22 and a hidden sheet metal panel 24 that functions as a backing plate of limited size for attaching a sun visor 26 or as a larger sheet metal panel that defines the interior roof of vehicle 20. Panel 24 is covered by a headliner 30, such a cushioned fabric material, that is colored to complement the decor of the vehicle interior. A layer of energy-absorbing material 25, such as foam or the like, may be disposed between panel 24 and headliner 30 to absorb the energy of an impact by the vehicle occupants during an accident.

A sun visor mounting assembly 32 secures sun visor 26 to panel 24 and/or headliner 30 and permits sun visor 26 to be pivoted about a substantially vertical axis from a position proximate windshield 22 to a position proximate a side window 34. Sun visor 26 is rotatably supported on a visor shaft 36 extending from mounting assembly 32 and can be secured to a support hook (not illustrated) when not in use. It will be appreciated by those skilled in the art that the design of sun visor 26 is not material to the present invention and that various sun visor designs, including those that employ electrical circuitry to illuminate a lamp on the visor, may be used.

Figure 3:
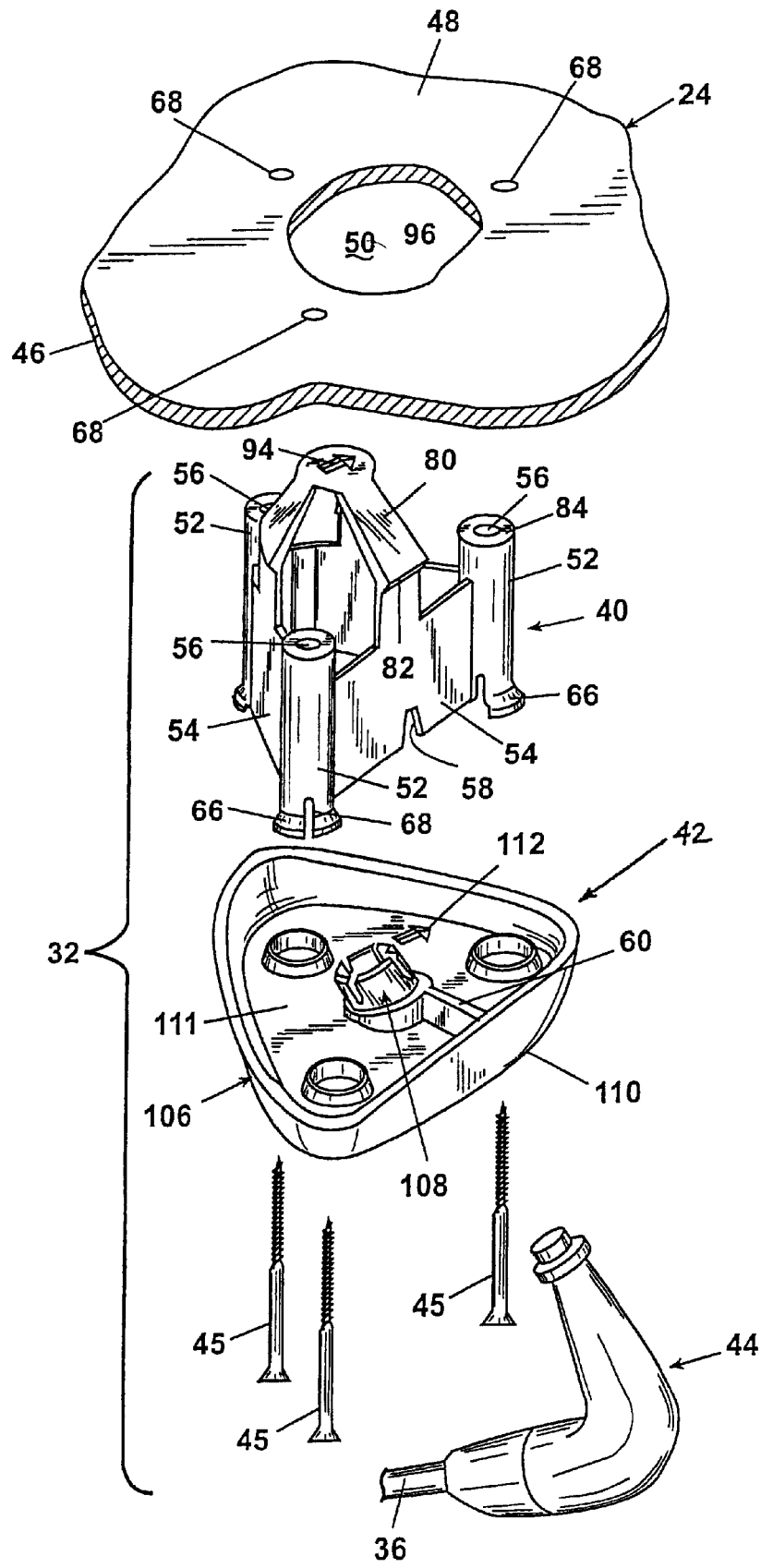
FIG. 3 is an exploded view of the mounting assembly of FIG. 2.

Referring to FIGS. 2 and 3, a preferred embodiment of mounting assembly 32 is shown in detail. Mounting assembly 32 includes a mounting component 40, a bezel component 42 and an elbow 44 that is connectable with sun visor 26 via visor shaft 36. A plurality of fasteners 45, such as screws or the like, pass through bezel component 42 and mounting component 40 to secure components 40 and 42 to panel 24. Panel 24 generally includes an inner surface 46, an outer surface 48 and an aperture 50 through which a portion of mounting component 40 is inserted to retain mounting component 40 against panel 24 until fasteners 45 may be installed. As illustrated in FIG. 2, energy-absorbing material 25 and headliner 30 rest adjacent inner surface 46, which in the preferred embodiment represents the inner face of the vehicle roof.

Mounting component 40 functions to retain bezel component 42, elbow 44 and sun visor 26 to panel 24 during installation of mounting assembly 32 into a vehicle. Mounting component 40 is preferably molded as a one-piece structure from a polymeric material, such as ABS or other suitable plastic. In a preferred embodiment, mounting component 40 includes a plurality of spaced apart towers 52, each interconnected by a sidewall 54. Towers 52 are generally cylindrical having a duct 56 that extends therethrough for receiving fasteners 45. Towers 52 are preferably spaced apart to form a polygonal-shaped mounting component 40, such as the triangular-shaped mounting component 40 illustrated in FIGS. 3 and 4. At least one sidewall 54 preferably includes a locator notch 58 for receiving a rib 60 on bezel component 42. During assembly of mounting assembly 32, rib 60 facilitates alignment of bezel component 42 with mounting component 40 to ensure proper assembly of bezel component 42 onto mounting component 40.

Referring to FIG. 4, each duct 56 preferably includes at least one inwardly extending finger 62 that engages fasteners 45 as they are inserted through ducts 56. As will be described below, fingers 62 temporarily retain fasteners 45 in ducts 56 so that mounting assembly 32 and fasteners 45 can be shipped as a single unit. Upon assembly into a vehicle, each fastener 45 engages an aperture 68 (shown in FIG. 3) in panel 24 to secure mounting component 40 and bezel component 42 to panel 24. While fasteners 45 are described and illustrated in the preferred embodiment as being screws, it is recognized that other suitable fasteners or fastening methods, such as a rivet or the like, may be employed to secure components 40 and 42 to panel 24.

As illustrated in FIGS. 3 and 4, each tower 52 preferably includes at least one foot 66. When tower 52 includes more than one foot 66, the feet are separated by a channel 68, as illustrated in FIG. 4. Feet 66 are configured to engage a ledge on bezel component 42 to temporarily retain bezel component 42 against mounting component 40 to facilitate shipment and installation, as will be described in detail below. Channels 68 provide room for feet 66 to flex as they mate with bezel component 42, as will also be described in further detail below.

Referring to FIG. 4, mounting component 40 includes a locator cone 72 having a generally flat head portion 74 and a plurality of retaining members 76 that extend downwardly from head portion 74 to a sidewall 44. As illustrated in FIG. 6, each retaining member 76 preferably includes a generally angled tab portion 79 characterized by a ramp 80 and a catch 82. Ramp 80 provides a lead-in as locator cone 72 is inserted into aperture 50 to facilitate installation. Each catch 82 is spaced apart axially from a distal end 84 of towers 52 to accommodate the thickness of panel 24. Referring still to FIG. 6, retaining members 76 are preferably resilient, spring-like members that deflect inwardly to a "deflected" position and return to a "latched" position (represented in phantom) upon complete insertion into aperture 50. The resiliency of retaining members 76 allows mounting component 40 to accommodate various sheet metal thicknesses or manufacturing imperfections in panel 24 and aperture 50, and orients mounting component 40 in the correct position until fasteners 45 can be installed. Once fully inserted into aperture 50, panel 24 is sandwiched between retaining members 76 and distal end 84 of towers 52 to retain mounting component 40 in panel 24.

Referring again to FIG. 4, one of retaining members 76 preferably includes a guide 86, which routes electrical power distribution wires (not illustrated) through mounting component 40 to provide power to various sun visor accessories, such as a lighted mirror. In a preferred embodiment, guide 86 includes a substantially flat body portion 88 that extends inwardly from one of sidewalls 44. Body portion 88 includes an integrally formed arm 90 that extends outward from body portion 88 to form a cavity 92, through which the power distribution wires are directed. Arm 90 may be substantially "L" shaped, as shown in FIG. 4, to inhibit the removal of the power distribution wires from cavity 92.

As also illustrated in FIG. 4, head portion 74 preferably includes an indicator 94 that is positioned to provide a visual assembly cue to facilitate proper installation of mounting component 40 with panel 24 and/or bezel component 42. In a preferred embodiment, indicator 94 is a directional arrow that is integrally formed with head portion 74, such as during an injection molding operation. Alternatively, indicator 94 may comprise a separate article, such as a decal, that is adhered to head portion 74 during manufacture.

Referring to FIGS. 3 and 5, the shape of aperture 50 in panel 24 is designed to ensure proper alignment of retaining members 76 as they are inserted into panel 24. Referring to FIG. 5, when viewed from the top, the orientation and shape of retaining members 76 are keyed to the shape of aperture 50. In this configuration, one or more inner walls 96 of aperture 50 may be non-linear to accommodate the position of retaining members 76. When mounting component 40 is inserted into aperture 50, each retaining member 76 is aligned with a corresponding inner wall 96 of aperture 50 so that there is substantially no rotational movement between mounting component 40 and panel 24.

Figure 7:
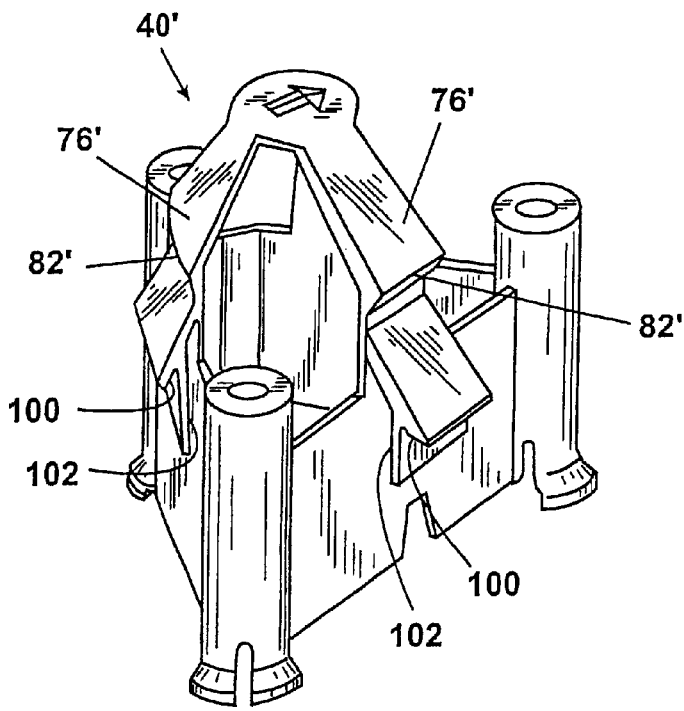
FIG. 7 is a perspective view of an alternate embodiment of the mounting component.
Figure 8:
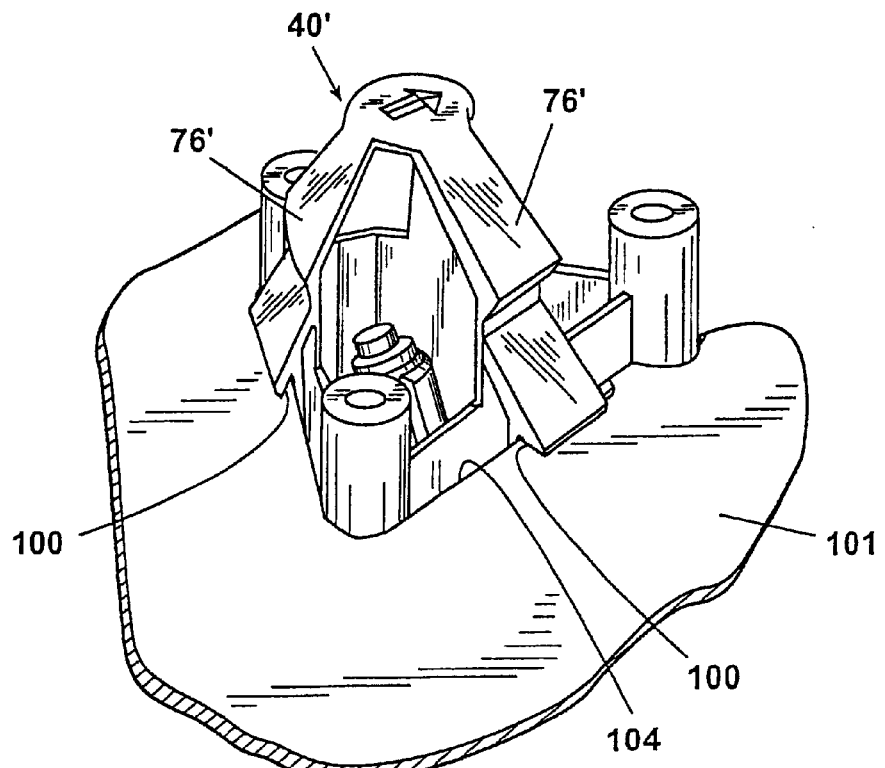
FIG. 8 is a perspective view the mounting component of FIG. 7 pre-installed in a vehicle headliner assembly.

Referring to FIGS. 7 and 8, an alternate embodiment of a mounting component 40' is shown in detail. In this embodiment, mounting component 40' is provided with a plurality of retaining members 76'. Retaining members 76' include a primary catch 82' and a secondary catch 100 having a leg 102 extending therefrom. As illustrated in FIG. 8, each secondary catch 100 is designed to engage a hole 104 in a vehicle headliner assembly 101 (including headliner 30 and impact-absorbing material 25) to facilitate packaging and shipment of mounting assembly 32 with headliner assembly 101, as will be described in further detail below. Leg 102 is designed to prevent secondary catch 100 from overextending and provides a means to selectively release mounting component 40' from aperture 50 if required.

Referring again to FIG. 3, bezel component 42 is generally molded in one-piece from a polymeric material, such as ABS or other suitable plastic. In a preferred embodiment, bezel component 42 includes a main body portion 106 and an integrally formed bearing portion 108. The shape of body portion 106 preferably corresponds to the polygonal shape of mounting component 40. An exposed outer surface 110 of bezel component 42 is aesthetically attractive and may be provided with a patterned texture. A hidden inner surface 111 of bezel component 42 is hidden from view once installed in vehicle 20. Hidden inner surface 111 preferably includes a visual indicator 112, which is substantially similar to indicator 94 on mounting component 40. Orientation of visual indicators 94 and 112 in the same direction facilitates proper installation of bezel component 42 unto mounting component 40.

Figure 9:
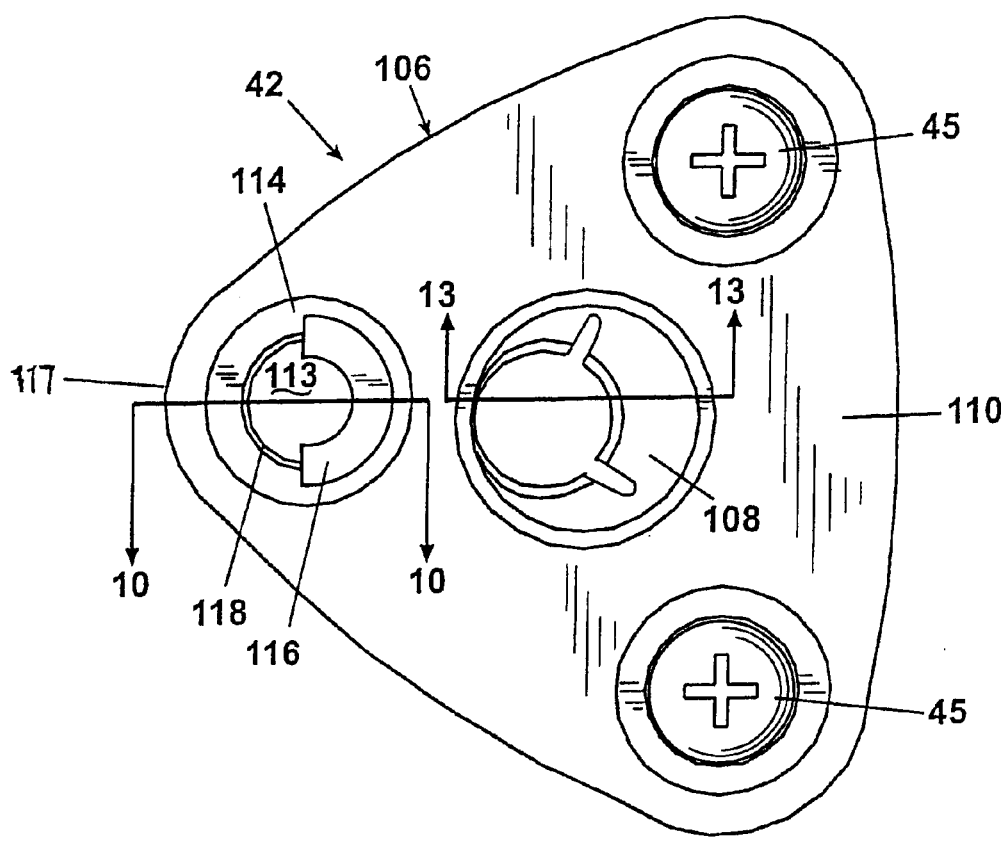
FIG. 9 is a plan view of a bezel component according to a preferred embodiment of the present invention.
Figure 10:
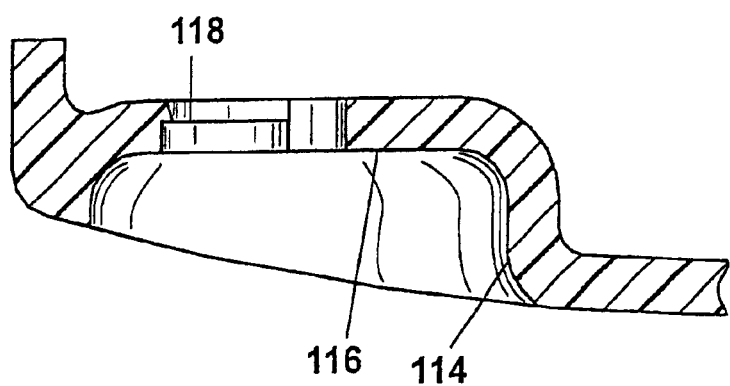
FIG. 10 is a cross sectional view along the line 10—10 in FIG. 9.
Figure 11:
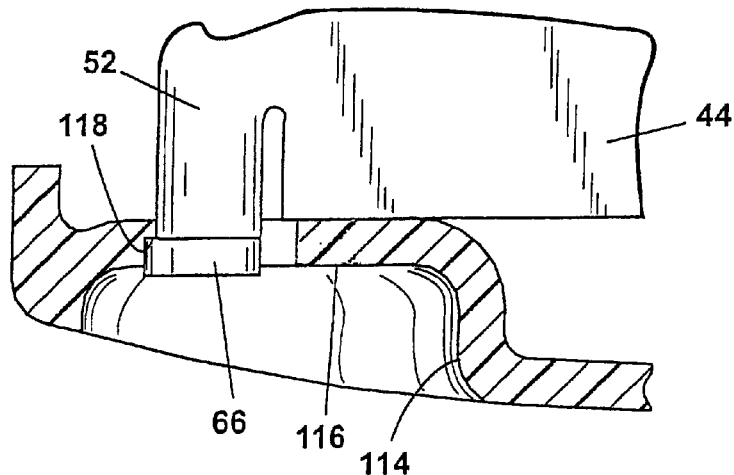
FIG. 11 is a partial cross-sectional view showing the bezel component of FIG. 9 secured to the mounting component.

Referring to FIGS. 9 and 10, body portion 106 includes a plurality of apertures 113 therethrough that correspond in position to ducts 56 in mounting component 40 or 40'. In a preferred embodiment, each aperture 113 is surrounded by a recess 114 that extends inwardly from exposed outer surface 110 to enable substantially flush mounting of fasteners 45 with exposed outer surface 110. Each aperture 113 is partially enclosed by a substantially semi-circular flat 116 that is preferably positioned in aperture 113 such that an open portion of aperture 113 is outward of flat 116 in a direction facing a corner 117 of bezel component 42. The remaining circumference of aperture 113 is not covered by flat 116, but includes a ledge 118. As illustrated in FIG. 11, ledge 118 is configured to engage feet 66 of towers 52 to retain bezel component 42 against mounting component 40 until fasteners 45 can be applied.

Figure 13:
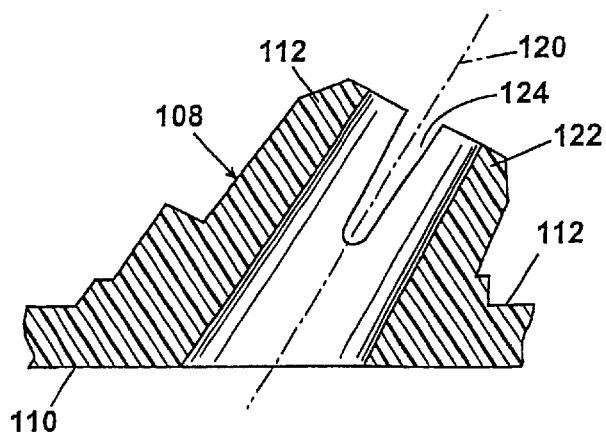
FIG. 13 is a cross-sectional view of the bezel component along the lines 13—13 of FIG. 9.
Figure 14:
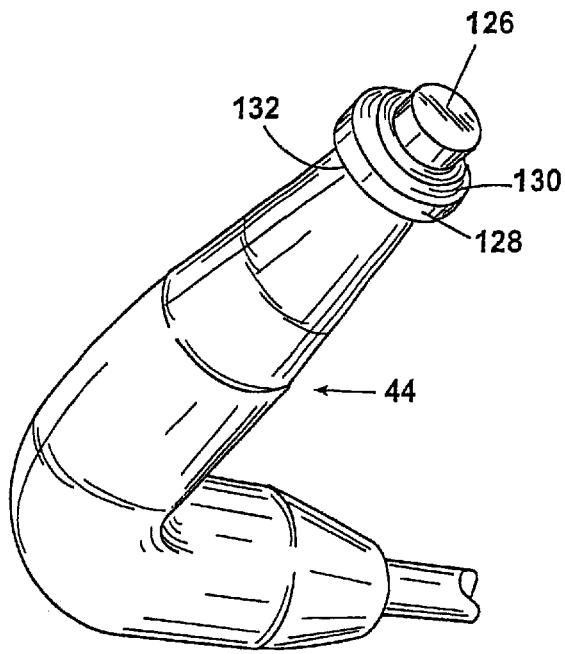
FIG. 14 is a perspective view of an elbow according to a preferred embodiment of the present invention.

Referring to FIGS. 13 and 14, a preferred embodiment of elbow 44 is shown in detail. Elbow 44 is configured to be received in bearing portion 108 about a pivot axis 120. Elbow 44 is retained in bearing portion 108 by a plurality of resilient legs 122 that are each at least partially separated by a slot 124. A distal end 126 of elbow 44 includes a flange 128 having a conical surface 130, which forces expansion of legs 122 during insertion of elbow 44 into bearing portion 108. As flange 128 moves above a distal end 131 of legs 122, legs 122 contract and engage an underside 132 of flange 128 to rotatably retain elbow 44 in bezel component 42. Alternatively, it will be appreciated that distal end 126 of elbow 44 may include a plurality of resilient legs with barbed ends that compress upon insertion into bearing portion 108. In addition, a typical compression spring and washer arrangement, or a key-holed and insert molded torque fitting construction can also be used to secure elbow 44 to bezel component 42, as is known in the art.

Figure 15:
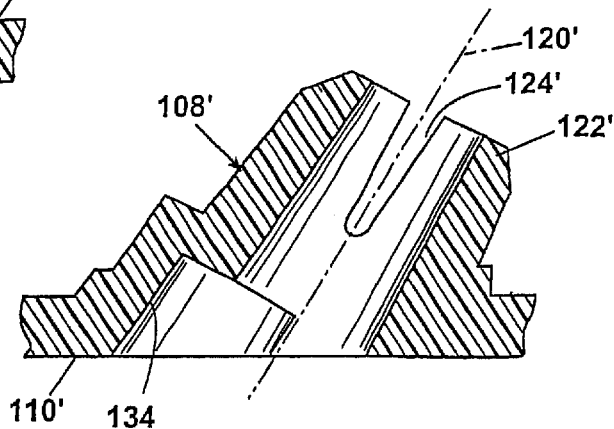
FIG. 15 is a cross-sectional view of an alternate embodiment of the bezel component along the lines 13—13 of FIG. 9.
Figure 16:
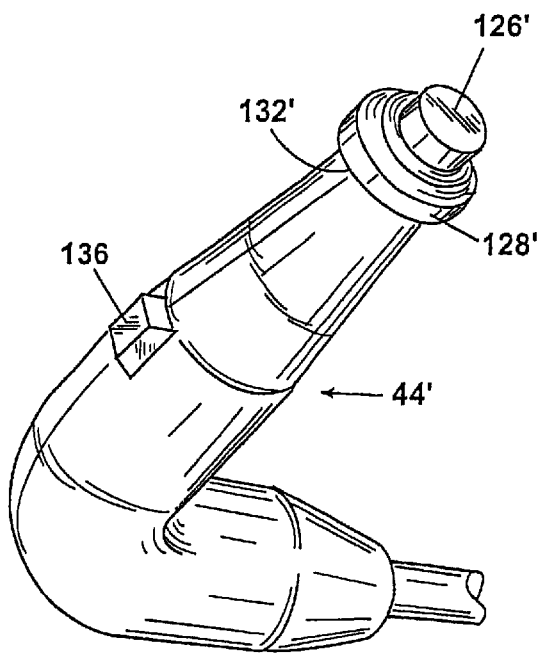
FIG. 16 is a perspective view of an elbow according to an alternate embodiment of the present invention.

Referring to FIGS. 15 and 16, another alternate embodiment of the present invention is shown in detail. In this embodiment, an elbow 44' is provided for insertion into a bearing portion 108' of bezel component 42 about a pivot axis 120'. Bearing portion 108' is substantially similar to bearing portion 108 described above with at least one exception, namely, bearing portion 108' includes a recess 134. Recess 134 is configured to receive a corresponding tab 136 located on elbow 44'. The shape of recess 134 and tab 136 may be configured to ensure that the correct sun visor 26, i.e., right or left hand side, is installed into mounting bracket assembly 32. Additionally, recess 134 and tab 136 substantially prevent elbow 44' and sun visor 26 from being rotated more than a predetermined angle, such as 180 degrees. Recess 134 is preferably integrally formed with bearing portion 108' and, more preferably, is positioned to a side of bearing portion 108' that makes it less visible to an occupant of vehicle 20.

The structure of mounting assembly 32 will be further understood in view of the following detailed description of the preferred methods of installation. In a first method of installation, impact-absorbing material 25 and headliner 30 are installed over panel 24 prior to attachment of mounting bracket assembly 32. As illustrated in FIG. 5, before elbow 44 and bezel component 42 are secured to mounting component 40, retaining members 76 of mounting component 40 are inserted into aperture 50 in panel 24 to secure mounting component 40 to panel 24. Indicator 94 can be aligned with a similar indicator (not illustrated) on panel 24 to provide the installer with a visual indication of the general direction in which mounting component 40 should be installed. Additionally, each retaining member 76 is oriented with the shape of aperture 50 so that ducts 56 align with apertures 68 in panel 24. During insertion, each retaining member 76 engages an inner periphery 96 of aperture 50, which causes each retaining member 76 to deflect inward, as shown in FIG. 6. As mounting component 40 is further inserted, catches 82 eventually pass outer surface 48 of panel 24 permitting the retaining members 76 to return to the "undeflected" position to sandwich panel 24 between the catch 82 of each retaining member 76 and the distal end 84 of towers 52.

After mounting component 40 is secured in panel 24, bezel component 42 is positioned over mounting component 40 by aligning apertures 113 with towers 52. Rib 60 on bezel component 42 must be aligned with locator notch 58 in mounting component 40 for towers 52 to properly seat in each aperture 113. The use of rib 60 permits a blind assembly of bezel component 42 to mounting component 40 to ensure the correct orientation for acceptance of elbow 44. As bezel component 42 is pushed onto mounting component 40, an inner surface of apertures 113 engage feet 66 of towers 52 causing feet 66 to deflect inwardly. As bezel component 42 is further pushed onto mounting component 40, feet 66 travel through apertures 80 until they reach ledge 118, whereby feet 66 spring back to their original "undeflected" position to engage ledge 118 and retain bezel component 42 against mounting component 40. Fasteners 45 are then inserted through apertures 80 and ducts 56 to engage panel 24.

Figure 17:
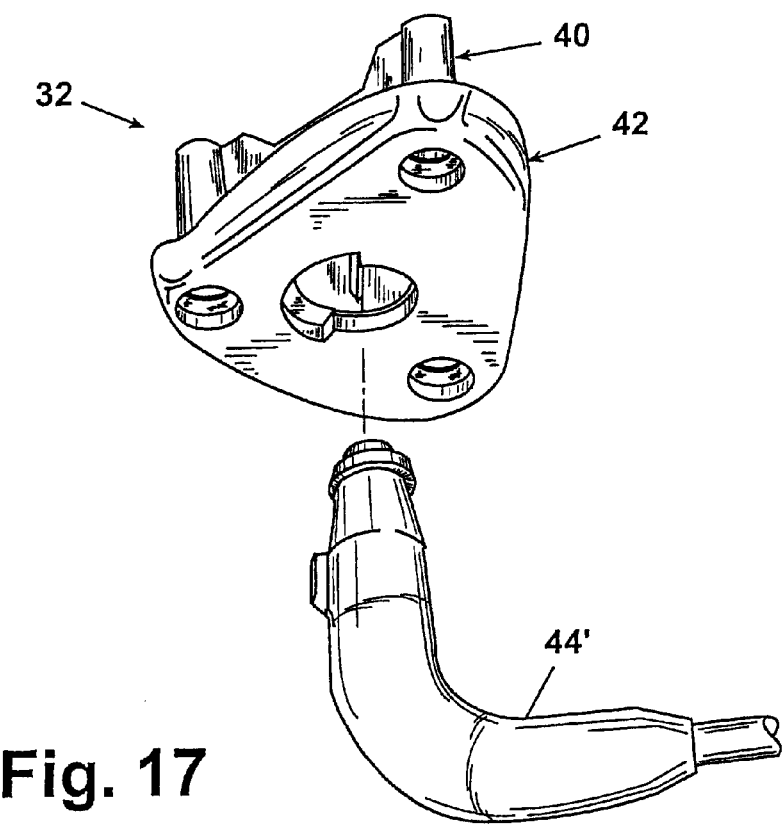
FIG. 17 is a perspective view of the mounting assembly prior to insertion of the elbow of FIG. 16 into the bezel component of FIG. 15.
Figure 18:
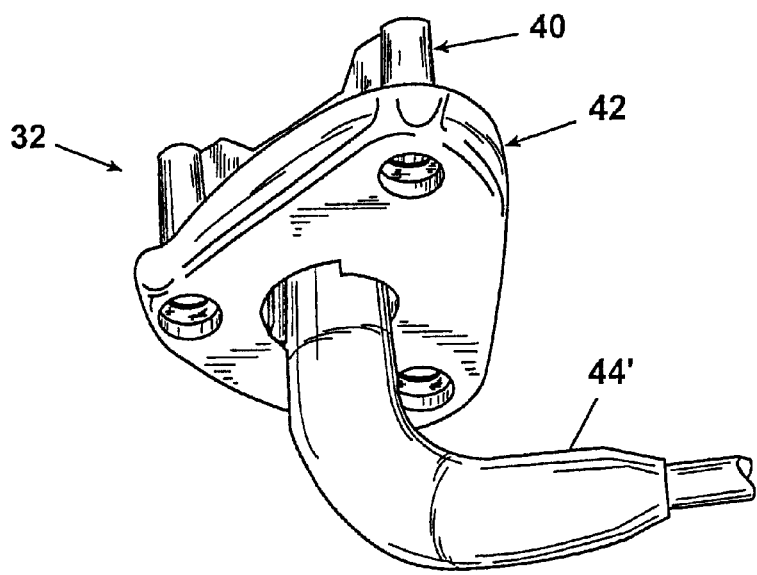
FIG. 18 is a perspective view of the mounting bracket assembly after insertion of the elbow of FIG. 16 into the bezel component of FIG. 15.

Referring to FIGS. 13–16, after bezel component 42 and mounting component 40 are secured to panel 24 with fasteners 45, elbow 44 is inserted into bearing portion 108. In the embodiment illustrated in FIGS. 17 and 18, elbow 44' is rotationally oriented with bearing portion 108' such that tab 136 may be inserted into recess 134. Upon proper alignment, distal end 126' of elbow 44' may then be inserted through bearing portion 108' forcing legs 122' to expand and permit passage of flange 128'. As flange 128' clears legs 122', the resiliency of legs 122' causes them to contract and engage the underside 132' of flange 128' to rotatably retain elbow 44' in bearing portion 108'.

Figure 12:
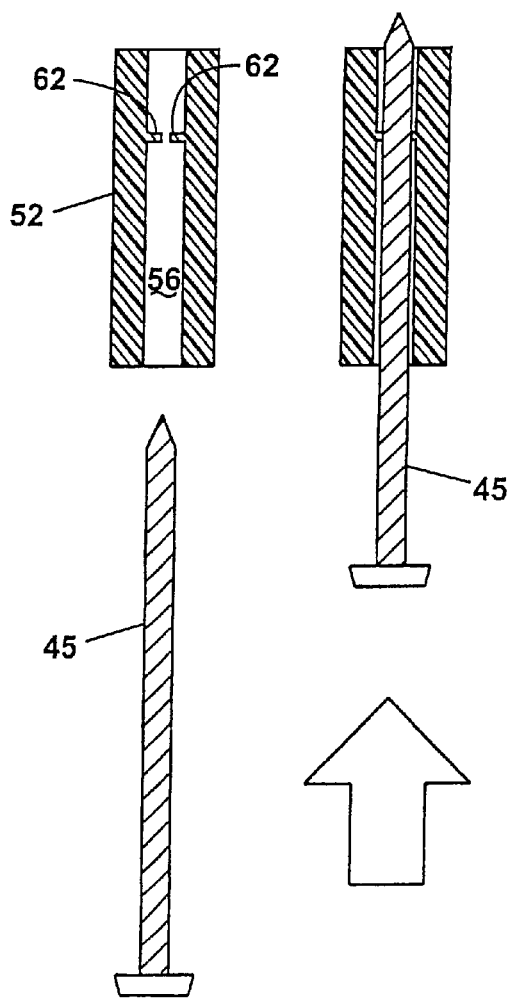
FIG. 12 is a partial cross-sectional view of a tower in the mounting component before and after insertion of a fastener.

In an alternate method of installation, mounting assembly 32 is first fully assembled prior to attachment to panel 24. In this method of installation, elbow 44 is secured to bezel component 42 prior to or subsequent to attachment of bezel component 42 with mounting component 40. Fasteners 45 may then be inserted through apertures 113 in bezel component 42 into ducts 56 in mounting component 40, where fasteners 45 are engaged and retained within ducts 56 by fingers 62, as shown in FIG. 12. The assembled mounting assembly 32 may then be attached to headliner assembly 101, as shown in FIG. 8, for installation into a vehicle as a single unit. Alternatively, the assembled mounting assembly 32 may be attached to a vehicle subsequent to attachment of headliner assembly 101. In either case, mounting component 40 is first inserted into aperture 50 to retain mounting assembly 32 against panel 24, as described above. Then, fasteners 45 are attached to panel 24 to secure mounting assembly 32 to panel 24.

While the present invention has been described with reference to the illustrated embodiments, it is recognized that various modifications to the embodiments of the present invention will be apparent to those skilled in the art without departing from the scope of the claimed invention. For example, those modifications include, but are not limited to, modifying the shape of bezel component 42, the length of mounting component 40, the number and shape of towers 52, and the shape and orientation of retaining members 76. Moreover, the inventive mounting component 40 may be utilized to secure other components in a vehicle, for example, to attach door panels to a vehicle door.

Although certain preferred embodiments of the present invention have been described, the invention is not limited to the illustrations described and shown herein, which are deemed to be merely illustrative of the best modes of carrying out the invention. A person of ordinary skill in the art will realize that certain modifications and variations will come within the teachings of this invention and that such variations and modifications are within its spirit and the scope as defined by the claims.

What is claimed is:

1. A mounting assembly for mounting a sun visor to a vehicle panel having opposing faces and an aperture therethrough, the mounting assembly comprising:
   an elbow connectable with the sun visor;
   a mounting component mountable to the vehicle panel and including a plurality of spaced apart towers separated by sidewalls, each of said towers having an end surface that engages a face of the vehicle panel, each sidewall including a resilient retaining member extending therefrom, said retaining members including a catch, wherein the opposing faces of the panel are gripped between said catch and said end surface of said towers to retain said mounting component against the vehicle panel; and
   a bezel component connected to said mounting component, said bezel component defining an opening within which said elbow is rotatably received.

2. The mounting bracket assembly of claim 1, wherein said towers include a duct therethrough for receiving a fastener that fixedly secures the mounting assembly to the vehicle panel.

3. The mounting bracket assembly of claim 2, wherein each duct includes at least one inwardly extending finger that engages and retains said fastener within said duct.

4. The mounting bracket assembly of claim 2, wherein said bezel component includes an aperture that coaxially aligns with each of said ducts in said towers.

5. The mounting bracket assembly of claim 4, wherein said towers include at least one foot that engages a ledge surrounding at least a portion of said apertures to secure said bezel component to said mounting component.

6. The mounting bracket assembly of claim 1, wherein at least one of said sidewalls includes a locator notch that receives a rib on said bezel component to provide for correct assembly of said bezel component with said mounting component.

7. The mounting bracket assembly of claim 1, wherein each retaining member includes a lead-in ramp for guiding each retaining member into the aperture in the vehicle panel.

8. The mounting bracket assembly of claim 1, wherein said retaining members cooperate to form a locator cone, each retaining member extending downwardly from said head portion to said sidewalls.

9. The mounting bracket assembly of claim 8, wherein each of said head portion and said bezel component include an indicator positioned to facilitate proper installation of the mounting assembly.

10. The mounting bracket assembly of claim 1, wherein the shape of each retaining member is keyed to the shape of the aperture in the vehicle panel.

11. The mounting bracket assembly of claim 1, wherein said mounting component further includes a guide for routing electrical power distribution wires through the mounting assembly.

12. The mounting bracket assembly of claim 1, wherein each of said retaining members include a secondary catch for engaging a vehicle headliner assembly.

13. The mounting bracket assembly of claim 1, wherein said elbow includes a tab that is received into a recess in said bezel component for limiting the degree of rotation of said elbow.

14. A mounting assembly for mounting a sun visor to a vehicle panel having opposing faces and an aperture therethrough, the mounting assembly comprising:
   an elbow connectable with the sun visor;
   a bezel component defining an opening within which said elbow is rotatably received, said bezel component including a plurality of apertures for receiving a fastener therethrough;
   a mounting component mountable to the panel and including a plurality of spaced apart towers separated by sidewalls, each of said towers including and end surface and a duct therethrough, at least one foot that engages a ledge surrounding at least a portion of said apertures to secure said bezel component to said mounting component, and an end surface that engages a face of the vehicle panel, each sidewall including a resilient retaining member extending therefrom, said retaining member including a catch, wherein the opposing faces of the vehicle panel are gripped between said catch and said end-surface of said towers to retain said mounting component against the vehicle panel; and
   wherein said fasteners extend through said ducts to engage and secure the mounting assembly to the vehicle panel.

15. The mounting bracket assembly of claim 14, wherein each duct includes at least one inwardly extending finger that engages and retains said fasteners within said ducts.

16. The mounting bracket assembly of claim 14, wherein at least one of said sidewalls includes a locator notch that receives a rib on said bezel component to prevent said bezel component from being incorrectly assembled onto said mounting component.

17. The mounting bracket assembly of claim 14, wherein each retaining member includes a secondary catch for engaging a vehicle headliner assembly.

18. The mounting bracket assembly of claim 14, wherein said elbow includes a tab that is received into a recess in said bezel component for limiting the degree of rotation of said elbow.

19. A method of securing a sun visor mounting assembly to a panel having an aperture, comprising the steps of:

providing a mounting assembly having a mounting component mountable to the vehicle panel and a bezel component that engages said mounting component, said mounting component including a plurality of spaced apart towers separated by sidewalls, each of said towers having an end surface that engages a face of the vehicle panel, each sidewall including a resilient retaining member extending therefrom, said retaining member including a catch, wherein the opposing faces of the vehicle panel are gripped between said catch and said towers to secure said mounting component to the vehicle panel, the bezel component defining an opening within which an elbow is received;

inserting said elbow into bezel component;

securing the bezel component to the mounting component;

inserting the fasteners through co-aligned apertures in the bezel component and the mounting component; and securing the mounting component to the panel by inserting the retaining members into the aperture.

20. The method of claim 19, further defined by securing the bezel component to the mounting component prior to securing the mounting component to the panel.

21. The method of claim 19, further defined by inserting the fasteners through co-aligned apertures in the bezel component and the mounting component prior to securing the mounting component to the panel.

22. The method of claim 19, further defined by securing the bezel component to the mounting component subsequent to securing the remounting component to the panel.

* * * * *

UNITED STATES PATENT AND TRADEMARK OFFICE
CERTIFICATE OF CORRECTION

PATENT NO. : 6,595,571 B1 Page 1 of 1
DATED : July 22, 2003
INVENTOR(S) : Scott E. Krebs et al.

It is certified that error appears in the above-identified patent and that said Letters Patent is hereby corrected as shown below:

<u>Column 10,</u>
Line 17, change "remounting" to -- mounting --.

Signed and Sealed this

Eleventh Day of November, 2003

JAMES E. ROGAN
*Director of the United States Patent and Trademark Office*